(12) United States Patent
Enomoto et al.

(10) Patent No.: US 8,937,422 B2
(45) Date of Patent: Jan. 20, 2015

(54) MAGNETIC IRON CORE, METHOD FOR MANUFACTURING THE SAME, AXIAL-GAP ROTATING ELECTRICAL MACHINE, AND STATIC ELECTRICAL MACHINE

(75) Inventors: Yuji Enomoto, Hitachi (JP); Zhuonan Wang, Hitachi (JP); Ryoso Masaki, Narashino (JP); Hiromitsu Itabashi, Tottori (JP)

(73) Assignees: Hitachi Industrial Equipment Systems Co., Ltd., Tokyo (JP); Hitachi Appliances, Inc., Tokyo (JP)

( * ) Notice: Subject to any disclaimer, the term of this patent is extended or adjusted under 35 U.S.C. 154(b) by 9 days.

(21) Appl. No.: 12/909,875

(22) Filed: Oct. 22, 2010

(65) Prior Publication Data
US 2011/0095642 A1  Apr. 28, 2011

(30) Foreign Application Priority Data
Oct. 22, 2009  (JP) ................. 2009-243234

(51) Int. Cl.
*H02K 1/06* (2006.01)
*H02K 1/04* (2006.01)
*H02K 21/24* (2006.01)
*H02K 1/14* (2006.01)
*H01F 3/04* (2006.01)
*H01F 41/02* (2006.01)
*H02K 15/02* (2006.01)

(52) U.S. Cl.
CPC .. *H02K 1/14* (2013.01); *H01F 3/04* (2013.01); *H01F 41/0226* (2013.01); *H02K 15/022* (2013.01); *H02K 21/24* (2013.01)
USPC ........ 310/216.045; 310/216.046; 310/156.32; 310/43

(58) Field of Classification Search
CPC ................. H02K 1/16; H02K 1/148
USPC ............. 310/216.041, 216.045, 216.046, 43, 310/156
See application file for complete search history.

(56) References Cited

U.S. PATENT DOCUMENTS

| 1,495,823 | A | * | 5/1924 | Underhill | 336/206 |
| 1,566,693 | A | * | 12/1925 | Pletscher | 310/152 |
| 3,436,571 | A | * | 4/1969 | French | 310/46 |
| 4,363,988 | A | * | 12/1982 | Kliman | 310/268 |

(Continued)

FOREIGN PATENT DOCUMENTS

| JP | 59-004005 | | 1/1984 | | |
| JP | 59181522 | A | * | 10/1984 | .............. H01F 41/02 |

(Continued)

OTHER PUBLICATIONS

JP 2002164224 A Machine Translation, Jun. 9, 2012.*

(Continued)

*Primary Examiner* — Quyen Leung
*Assistant Examiner* — Thomas Truong
(74) *Attorney, Agent, or Firm* — Antonelli, Terry, Stout & Kraus, LLP.

(57) ABSTRACT

The magnetic iron core includes an amorphous foil strip wound to form the magnetic iron core. Preferably, the magnetic iron core is filled with resin, the resin being disposed by using a spacer between pluralities of windings of the amorphous foil strip. Preferably, the magnetic iron core is covered with resin integrated with and continuous to the resin disposed between pluralities of windings of the amorphous foil strip.

12 Claims, 9 Drawing Sheets

(56) References Cited

U.S. PATENT DOCUMENTS

| | | | |
|---|---|---|---|
| 4,621,248 A * | 11/1986 | Shigeta et al. | 336/178 |
| 6,246,172 B1 * | 6/2001 | Bizen et al. | 315/5.41 |
| 6,803,694 B2 * | 10/2004 | Decristofaro et al. | 310/216.106 |
| 2006/0061229 A1 * | 3/2006 | Suzuki et al. | 310/217 |
| 2006/0113856 A1 * | 6/2006 | Tanno et al. | 310/156.37 |
| 2008/0007133 A1 * | 1/2008 | Onimaru et al. | 310/208 |

FOREIGN PATENT DOCUMENTS

| | | | | |
|---|---|---|---|---|
| JP | 04-148927 | 5/1992 | | |
| JP | 11-312604 | 11/1999 | | |
| JP | 2002164224 A * | 6/2002 | | H01F 27/24 |
| JP | 2004007917 A * | 1/2004 | | H02K 1/12 |
| JP | 2005-168124 | 6/2005 | | |
| JP | 2005-287212 | 10/2005 | | |
| JP | 2008-061299 | 3/2008 | | |
| JP | 2008-086142 | 4/2008 | | |

OTHER PUBLICATIONS

Machine Translation, Narita et al., JP 2004007917 A, Jan. 8, 2004.*
USPTO Translation, Takekoshi et al., JP 59181522 A, Oct. 16, 1984.*
Japanese Office Action dated Sep. 10, 2013 for Application No. 2009-243234 and partial English translation.

* cited by examiner

CROSS-SECTIONAL VIEW OF WOUND CORE AFTER MOLDED WITH RESIN,
TAKEN FROM LINE A-A OF FIG. 2A

CROSS-SECTIONAL VIEW OF WOUND CORE AFTER MOLDED WITH RESIN,
SHOWING CROSS SECTION OF THE SAME SPOT AS SHOWN IN FIG. 2B

MAGNETIC IRON CORE, METHOD FOR MANUFACTURING THE SAME, AXIAL-GAP ROTATING ELECTRICAL MACHINE, AND STATIC ELECTRICAL MACHINE

CLAIM OF PRIORITY

The present application claims priority from Japanese Patent Application JP 2009-243234 filed on Oct. 22, 2009, the content of which is hereby incorporated by reference into this application.

FIELD OF THE INVENTION

The invention relates to a structure of an iron core in which amorphous magnetic foil strips and steel sheets are utilized. Further, the invention relates to a rotating electrical machine in which the iron core is used for a stator and a rotor, and a static electrical machine in which the iron core is used for a reactor or a transformer.

BACKGROUND OF THE INVENTION

Greater importance has come to be attached to the needs for saving of energy in the fields of industrial equipment, home electrical appliances, automotive components, and so forth in recent years. Most of electricity is now generated by domestic power plants, such as a thermal power plant, hydraulic power plant, nuclear power plant, and wind power plant, and those domestic power plants each make use of a rotating electrical machine (generator) that is an electromagnetic application product. Further, driving of rotating electrical machines (motors) accounts for the majority of domestic power consumption. Furthermore, a static electrical machine, such as a transformer, a reactor, for use in transmission of the power, is also an electromagnetic application product. With those electromagnetic application products, a soft magnetic material is used in the iron core thereof, and reduction in loss occurring to the iron core renders it possible to achieve higher efficiency. Further, reduction in cost as well as higher efficiency is required of those electromagnetic application products.

The rotating electrical machine has a basic structure including iron cores made of a soft magnetic material, coils, permanent magnets, and so forth. Loss occurring to a rotating electrical machine falls into two broad categories, that is, iron loss and copper loss. The iron loss is dependent on properties of a soft magnetic material. The copper loss is dependent on a resistance value of the coils, that is, a packing factor, so that the more compact a winding is structured, the less the loss can be rendered. Enhancement in efficiency can be achieved by designing a rotating electrical machine in respect of shape, size, and so forth, such that the loss can be minimized. Changing of properties of material can also contribute to higher efficiency.

The same can be said of a static electrical machine. Iron cores and coils made of a soft magnetic material, making up the static electrical machine, have iron loss and copper loss. The smaller the losses are, the better in efficiency the machine is.

An amorphous metal has low iron-loss characteristics belonging in the top class among soft magnetic materials. Since the amorphous metal is produced by a method for forming an amorphous material by quenching, the amorphous metal can be formed only in the form of a foil strip (in a ribbon-like form) that is small in thickness. For this reason, it has been difficult to render the amorphous metal into the shape of an iron core, and hence, the amorphous metal has not been adopted for the electromagnetic application product described above.

As an example in which the amorphous metal is used for an iron core, a wound iron core can be cited. Because the wound iron core can be made up simply by winding a foil strip, drawbacks of the amorphous metal, such as poor workability, difficulty in handling because of its small thickness, and so forth, can be complemented by the wound iron core. In the case of using a wound iron core as it is, as a motor, without splitting it by cutting, such a configuration as that of an axial gap motor (an axial-gap rotating electrical machine) is suitable for application.

The basic structure of the axial-gap rotating electrical machine includes such a structure as is shown in Japanese Unexamined Patent Application Publication No. 2005-287212. This structure includes a teeth-part and a yoke part, having opposed surfaces contributing to a torque output at only one location in the axial direction. Since magnetic fluxes flow from the teeth-part to the yoke part in the above structure, there is the need for using a soft magnetic material chosen by taking into consideration three-dimensional flow of the magnetic fluxes. In order to meet such requirements, it is necessary to use material of magnetic characteristics having three-dimensional isotropy, such as a dust core, and so forth. However, there is a problem that such material is low in magnetic permeability as compared with a common silicon steel, and so forth, and large in iron loss, so that miniaturization is difficult to implement.

As a method for solving the problem described above, there is a technology whereby an iron core is made up of an amorphous metal by providing opposed surfaces on two planes along the axial direction thereof. A problem with this technology lies in a method for manufacturing an iron core. In the case of manufacturing the iron core, a wound iron core is split by cutting, thereby obtaining iron cores of individual stators. In this case, it is required that the wound iron core is fixedly held and has a high strength so as to be able to withstand the cutting. For this purpose, there is a method for impregnating both the periphery of the wound iron core and a gap between foil strips with resin to obtain strength sufficient for withstanding the cutting. However, in order to implement such a structure, impregnation with resin should be carried out in a vacuum or a reduced-pressure atmosphere, leading to a problem that much time is required to manufacture just one iron core.

An object of the invention is, solving problems with the conventional technology, to provide a high-quality magnetic iron core by concurrently satisfying requirements for enhancement in strength of a wound iron core, particularly, strength of a wound iron core made up of amorphous foil strips, reduction in manufacturing time, and manufacturing cost. Another object of the invention is to provide an electromagnetic application product highly efficient and small in size as an application of the magnetic iron core.

SUMMARY OF THE INVENTION

To solve problems described above, a magnetic iron core according to the present invention has the following features.

According to one aspect of the present invention, a magnetic iron core includes an amorphous foil strip being wound to form the magnetic iron core. The magnetic iron core is filled with resin, the resin being disposed in every plural turns of windings of the amorphous foil strip.

Preferably, the magnetic iron core is filled with the resin, the resin being disposed by using a spacer in every plural turns of windings of the amorphous foil strip. Preferably, the magnetic iron core is covered with resin which is integrated with and continuous to the resin disposed in every plural turns of windings of the amorphous foil strip.

According to another aspect of the present invention, a magnetic iron core includes an amorphous foil strip being layered to form the magnetic iron core. The magnetic iron core is one of plural core segments into which the magnetic iron core according to claim 1 is split, and each of the core segments is cut in a shape of a quasi-hexahedron. Each of cutting surfaces of the magnetic iron core has a lamination plane alternately including a multi-layer of the amorphous foil strip and a layer of the resin, and other surfaces of the magnetic iron core are covered with the resin.

Preferably, the layer of the resin in each of the cutting surfaces of the magnetic iron core is integrated with and continuous to the resin covering the other surfaces of the magnetic iron core.

According to another aspect of the present invention, a magnetic iron core includes an electromagnetic steel sheet or a cold-rolled steel sheet being wound to form the magnetic iron core. The magnetic iron core is filled with resin so that an iron-core packing factor is 80% or more, the resin being disposed in every plural turns of windings of the electromagnetic steel sheet or the cold-rolled steel sheet.

An axial-gap rotating electrical machine according to the present invention has the following features.

According to another aspect of the present invention, an axial-gap rotating electrical machine includes at least a stator including an iron core and a rotor including a yoke. At least either the iron core or the yoke includes any one of the magnetic iron cores described above.

According to another aspect of the present invention, a static electrical machine includes any one of the magnetic iron cores described above and a coil.

To solve the problems described above, a method for manufacturing a magnetic iron core, according to the present invention, has the following features.

According to another aspect of the present invention, a method for manufacturing a magnetic iron core includes the steps of winding an amorphous foil strip for a predetermined number of turns; repeatedly executing the step of winding the amorphous foil strip with a spacer to forma gap between windings of the amorphous foil strip; and filling the gap with resin.

According to another aspect of the present invention, a method for manufacturing a magnetic iron core includes the steps of forming a laminate of an amorphous foil strip by winding the amorphous foil strip with a spacer to forma gap to be filled with resin; disposing the laminate of the amorphous foil strip in a mold, a shape of the laminate being kept to have the gap; and injecting the resin to the laminate in the mold by injection molding or transfer molding.

With the present invention, an iron core made up by winding an amorphous foil strip, an electromagnetic steel sheet, or a cold-rolled steel sheet can be kept at high strength. Therefore, it is possible to enhance reliability in the case where the iron core is cut or applied to an electromagnetic application product, such as a rotating electrical machine and a static electrical machine. Furthermore, the iron core can be manufactured at a low cost and in short time. Therefore, it is possible to concurrently meet requirements for both higher efficiency and lower cost in the electromagnetic application product using the iron core.

DETAILED DESCRIPTION OF THE PREFERRED EMBODIMENTS

Figure 1:
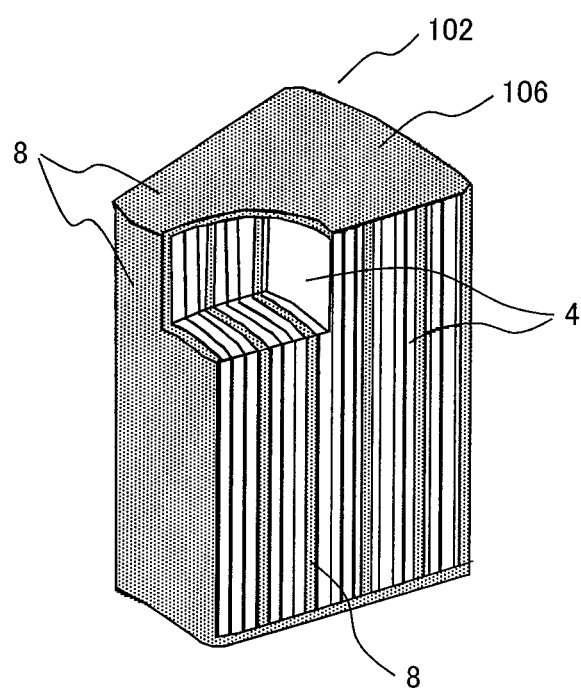
FIG. 1 is a view showing a structure of an iron core of a stator, according to a first embodiment of the invention, made by layering an amorphous foil strip.

The present invention has features that, at the time of manufacturing a magnetic iron core (a wound iron core) that is made by winding a foil strip of an amorphous magnetic material (an amorphous foil strip), gaps in which resin is to be disposed are provided before the amorphous foil strip is wound; a laminate of the amorphous foil strip are disposed in a mold or the like, a shape of the laminate being kept to have the gap; and the resin is injected by injection molding, transfer molding, or the like; and the resin and the laminate of the amorphous foil strip are alternately disposed to enhance the strength of the wound iron core. For the amorphous magnetic material, an iron-base amorphous metal or a cobalt-base amorphous metal can be used.

The gaps are formed by interposing a spacer of an insulating material between the laminates of the amorphous foil strip when the amorphous foil strip is wound. More specifically, as for a method for forming the gaps, a preferable mode is that, at the time of winding the amorphous foil strip, winding is executed while disposing a plurality of spacers in the circumferential direction of the magnetic iron core once in every predetermined plural turns of windings to form the gaps. Further, if it is difficult to dispose a plurality of spacers in the circumferential direction of the magnetic iron core, there is another method that one piece or a plurality of spacers (for example, in a ring-like shape) covering the whole area in the circumferential direction of the magnetic iron core are disposed in the winding direction of the foil strips (in the axial direction of the wound iron core).

The spacer to be sandwiched between the laminates of the amorphous foil strip preferably has a thickness corresponding to a critical dimension allowing resin to flow by an injection molding method, a transfer molding method, or the like. If the spacer is large in thickness, a region of an insulation part in iron core members increases, causing an iron-core packing factor considerably to be small, which is undesirable. Further, if the spacer is too small in thickness, the resin does not flow inside the gap, making a void (a gap). This raises a possibility that exfoliation occurs from the void, for example, at a time when a wound iron core is cut.

A hybrid material composed of an amorphous material and resin, used in the invention, has a structure in which resin parts are three-dimensionally bonded together, so that the hybrid material is effective when a portion of a wound iron core is cut off by a method of cutting, and so forth.

Further, even if an electromagnetic steel sheet and a cold-rolled steel sheet are used in place of the amorphous foil strip to be wound, the same effect above can be obtained.

Still further, the magnetic iron core according to the invention is not only in the shape of a circular cylinder but also in a shape which has a cross-sectional shape, in a plane perpendicular to the axial direction in which the amorphous foil strip is wound, including a circle, an oval, an ellipse, a quasi-polygon, or other various types. In the present description, the oval is a shape made up by two straight lines opposed to each other and two arcs, each of arcs connecting the two straight lines, or a shape similar thereto. The quasi-polygon includes a polygon having a curvilinear corner such as an arc, a polygon where a side thereof is curvilinear, and a perfect polygon.

Furthermore, the magnetic iron core according to the invention can be cut to be rendered into the shape of an iron core suitable for a stator, and can be made up so as to be suitable for the iron core of a stator and a rotor in the rotating electrical machine and the static electrical machine applied to the electromagnetic application product.

Embodiments of a magnetic iron core according to the invention are described hereinafter with reference to the accompanying drawings.

First Embodiment

A first embodiment of a magnetic iron core according to the invention is described with reference to FIGS. 1 to 4B.

FIG. 1 shows an iron core to be used for a stator, which is one of plural core segments into which an iron core (a wound iron core) according to the invention, including an amorphous magnetic foil strip, is cut and split.

This iron core 102 has a shape of a quasi-hexahedron, and a top plane-surface, a bottom plane-surface, and two opposed plane-surfaces of side plane-surfaces, shown in FIG. 1, are covered with resin. Each of the remaining two opposed plane-surfaces of the side plane-surfaces has a lamination plane where laminates of the amorphous foil strip 4 and thin resin parts 8 are visible. Herein, the quasi-hexahedron includes a hexahedron having a curvature at a joint between the plane-surfaces thereof, a hexahedron having a plane-surface that is a curved surface, and a perfect hexahedron.

Among the side plane-surfaces, the side plane-surfaces where the laminates of the amorphous foil strip 4 and the thin resin parts 8 are visible are cutting surfaces. The cutting surfaces are formed upon cutting the wound iron core and alternately include a multi-layer of the amorphous foil strip 4 and a thin layer of the resin. The plane-surfaces covered with the resin among the side plane-surfaces are plane-surfaces other than the cutting surfaces.

In FIG. 1, the amorphous foil strips 4 are layered in the lateral direction in the figure. The resin part 8 is disposed for every laminate of the plurality of windings of the amorphous foil strips 4, and is continuously integrated with other resin parts 8 covering the top plane-surface and the bottom plane-surface. The top plane-surface and the bottom plane-surface serve as a gap plane-surface 106 opposite to a magnet.

The plurality of resin parts 8, disposed between the laminates of the amorphous foil strip 4, are periodically or non-periodically disposed at every plural windings of the amorphous foil strip 4, and as described above, any of those resin parts 8 is continuously integrated with other resin parts 8 covering the top plane-surface and the bottom plane-surface. In FIG. 1, a portion of the iron core 102 is cut out to show an internal structure. In the internal structure, the resin part 8 is continuously disposed between the laminates of the amorphous foil strip 4 both in the axial direction and in the circumferential direction within the iron core 102 as well to securely hold the respective the amorphous foil strips 4.

Figure 2A:
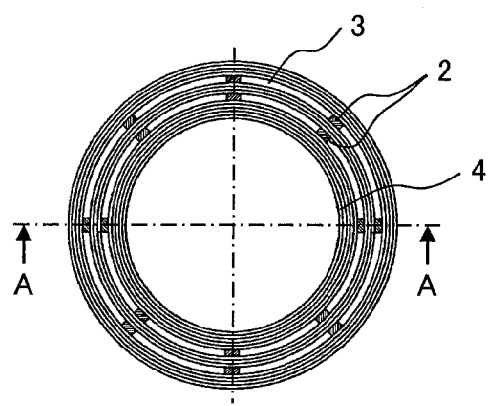
FIG. 2A is a view of the iron core according to the first embodiment of the invention, made by layering the amorphous foil strip, as seen from the axial direction thereof.
Figure 2B:
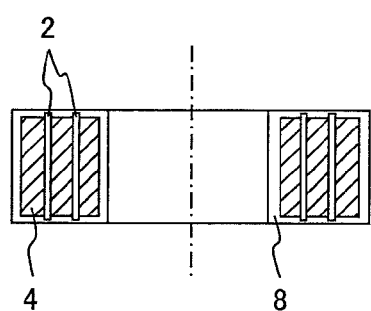
FIG. 2B is a cross-sectional view showing the iron core according to the first embodiment of the invention in a plane parallel to the axial direction thereof.

FIGS. 2A and 2B show an example method for manufacturing the iron core 102 shown in FIG. 1

FIG. 2A is a view of a wound iron core in a manufacturing process, seen from the axial direction of a ring-like core (not shown) around which the amorphous foil strip 4 is annularly wound. In FIG. 2A, between the laminates of the amorphous foil strip 4, eight spacers 2 are disposed in the circumferential direction, and two spacers 2 are disposed in the radial direction, respectively, so that sixteen spacers 2 are disposed in total, forming gaps 3.

The amorphous foil strip 4 is wound from the inner side, and the spacer 2 is disposed at the eight locations in the circumferential direction of the wound iron core, as shown in the figure, at a point in time that a round count of winding is a plurality of turns. In this example, the round count is assumed to be 40. Since the amorphous foil strip 4, 0.025 mm in thickness, is wound by 40 turns, the laminate of the amorphous foil strip 4 is approximately 1.0 mm in thickness.

The spacer 2 is structured in such a way as to be continuously extended in the axis direction along which the amorphous foil strip 4 is wound. The spacer 2 is made of, for example, engineering plastics. For positioning of the spacer 2, the spacer 2 may be held by using an adhesive tape or an adhesive material in order to temporary secure the the spacer 2. The thickness of the spacer 2 is set to, for example, on the order of 0.2 mm.

After the spacer 2 is disposed at the eight locations in the circumferential direction, the amorphous foil strip 4 is further wound on the spacer 2 to form the gaps 3, and upon completion of winding by 40 turns again, the spacer 2 with a thickness of 0.2 mm is disposed in the same way above, proceeding to further wind the amorphous foil strip 4.

Thus, if the gap 3 is set to 0.2 mm in gap dimension against 40-turn winding of the amorphous foil strip 4 with 0.025 mm in thickness, that is, against the laminate of the amorphous foil strips 4 having a thickness of 1.0 mm, the magnetic iron core according to the invention can have an iron-core packing factor of 80%. In order to obtain magnetizing properties required of a rotating electrical machine (motor), the iron-core packing factor needs to be 80% or more. Accordingly, it is possible to improve the iron-core packing factor to 80% or more by disposing the spacer 2 every time that the amorphous foil strip 4 is wound by 40 turns or more, although, in the present embodiment of the invention, the spacer 2 is disposed every time that the amorphous foil strip 4 is wound by 40 turns.

FIG. 2B is a cross-sectional view of the wound iron core formed by molding with resin after the amorphous foil strip 4 has been wound, taken from a line A-A of FIG. 2A. In this case, the resin is molded in such a state as to cover the wound iron core in whole. Further, the resin does not find its way into the laminate of the amorphous foil strips 4 and fills up only the gaps 3 (refer to FIG. 2A) interposing the spacer 2 therebetween. Thus, the resin parts 8 of the wound iron core are formed.

As a method for molding of the resin, the injection molding method or the transfer molding method are suitable, which are capable of executing molding in a short time. Any type of resin excellent in flow characteristics is suitable for this method. However, in the case of a thermoplastic resin, preferable engineering plastics includes PPS (polyphenylenesulfide), PC (polycarbonate), PET (polyphenyleneterephthalate), POM (polyoxymethylene) PP (polypropylene) PEEK {poly (etheretherketone)}, LCP (liquid crystal polymer), and so forth from the standpoint of securing strength. Further, a method for increasing the strength with the use of a grade obtained by putting filler into those plastics can be used although a problem with flow characteristics remains. As a thermosetting resin, an epoxy resin, an unsaturated polyester resin, and so forth are suitable. Because those resins are excellent in flow characteristics, even a gap 0.2 mm in dimension can be impregnated with one of those resins at a low pressure. Furthermore, use of resin containing silica and alumina is effective for improvement in thermal conduction.

Figure 3A:
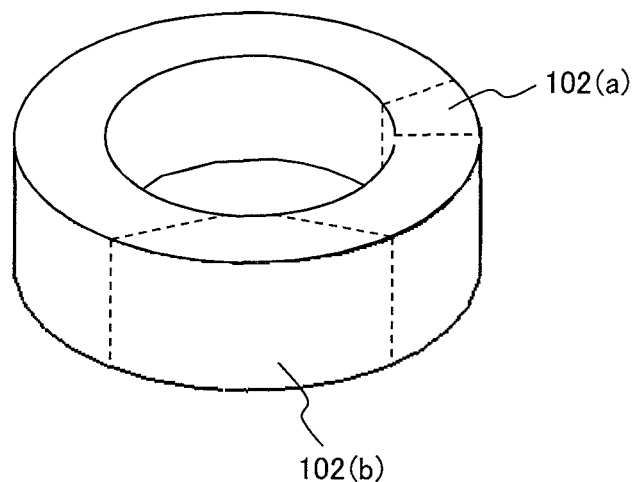
FIG. 3A is a perspective view showing cut shapes of the iron core according to the first embodiment of the invention.
Figure 3B:
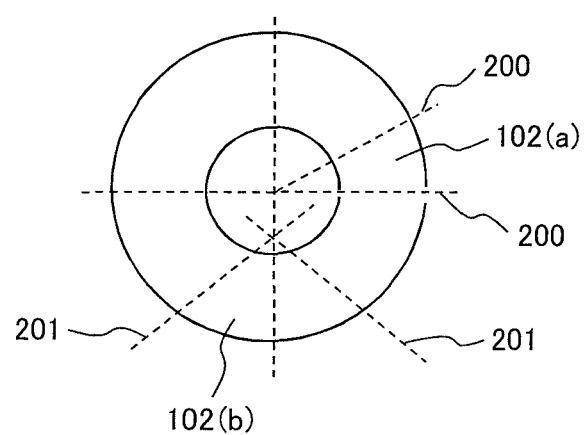
FIG. 3B is a top view showing cut shapes of the iron core according to the first embodiment of the invention.

FIGS. 3A and 3B show a concept under which the wound iron core formed by molding of the above resin is split by cutting to make an iron core for a stator. FIG. 3A is a perspective view of the iron core, and FIG. 3B is a top view thereof. Dotted lines in the figures indicate cut lines for obtaining an iron core 102 (a) and an iron core 102 (b).

The wound iron core can be normally cut with a grindstone, or the like. A cut-shape is described hereinafter with reference to FIG. 3B. The cut-shape includes a shape like that of the iron core 102 (a), obtained by cutting the wound iron core along a cut-line 200 extending from the central axis toward the radial direction (the normal direction) with the use of a cutting blade, evenly splitting the wound iron core in the circumferential direction. The cut-shape also includes a shape like that of the iron core 102 (b), obtained by cutting the wound iron core along a cut-line 201 at an angle to the normal direction. The wound iron core can be in a more complex shape, however, such a shape may be unadvisable when a manufacturing cost is taken into consideration. If the wound iron core is cut like an above description, the stator iron core, made up of the laminates of the amorphous foil strips 4 and shown in FIG. 1, can be obtained.

An amorphous foil strip is normally very small in thickness, as small as 25 µm. The reason for this is that material large in thickness cannot be produced because an amorphous metal is produced by a quenching method. An iron-base amorphous metal for a magnetic material is produced by a method whereby molten iron is dropped onto a roll rotating at a high-speed to be subsequently quenched, and rendered into a thin foil-strip shape before being coiled. An amorphous foil-strip produced by above method has one plane-surface having very fine surface roughness, that is, a specular plane-surface. With a wound iron core made of such amorphous foil-strips, one plane-surface of either an inner side or an outer side of the wound iron core is a specular plane-surface, so that there can be a case where the surface roughness thereof is finer than that of a mold depending on the structure of a resin-mold, causing a problem that the resin is susceptible to exfoliation from the surface of an amorphous metal upon cutting of the wound iron core.

Conventionally, the resin part is provided only at the innermost peripheral layer and the outermost peripheral layer of the wound iron core. In the present invention, the resin part is provided at a plurality of locations between the innermost peripheral layer and the outermost peripheral layer of the wound iron core, and the resin part is continuously integrated with other resin parts covering the top plane-surface and the bottom plane-surface, forming a structure in which the strength of the wound iron core can be increased by virtue of the resin parts alone to securely hold the laminates of the amorphous foil strip.

Figure 4A:
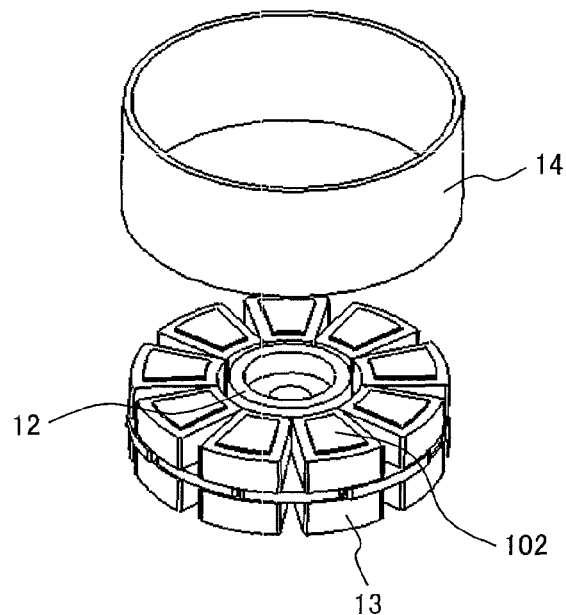
FIG. 4A is a view showing a stator in the case where the iron core according to the first embodiment of the invention is used as an iron core of a stator of an axial gap motor.
Figure 4B:
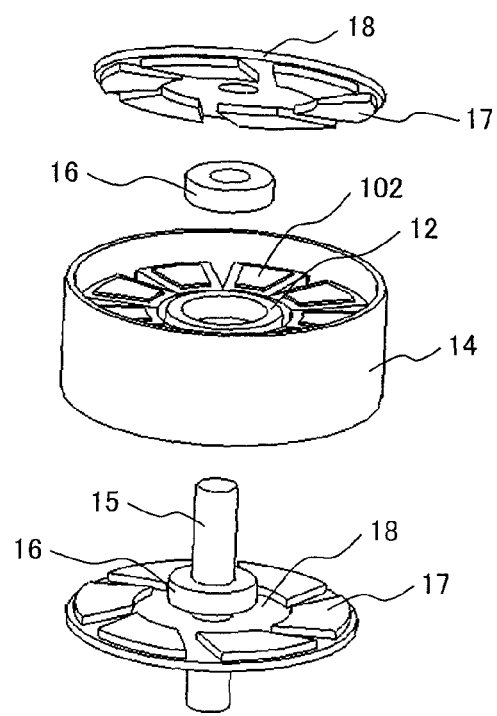
FIG. 4B is an assembly view showing the stator in the case where the iron core according to the first embodiment of the invention is used as an iron core of a stator of an axial gap motor.

FIGS. 4A and 4B show a configuration example of a rotating electrical machine using an iron core made with the layered amorphous foil strip. In this example, a stator of an axial gap motor is shown and an iron core of the stator has the iron core according to the invention shown in FIG. 1. The iron core 102 according to the invention has a substantially fan-shaped cross section perpendicular to the axial direction, serving as one pole of the iron core of the stator of the axial gap motor. In the example shown in FIGS. 4A and 4B, a rotating electrical machine is shown to have six pieces of magnet poles and nine pieces of stator magnetic poles.

As shown in FIG. 4A, the stator includes a coil 13, which is a wound conductor, disposed around each periphery of the nine pieces of the iron cores 102 disposed in the circumferential direction of the stator. As previously described with reference to FIGS. 3A and 3B, the iron core 102 is a split magnetic iron core obtained by cutting the wound iron core. A bearing holder 12 for holding bearings is disposed at the central part of the stator including the iron cores 102 and the coils 13. The bearing holder 12 also functions as a fixing member (stator iron-core holder) for maintaining and fixing a relationship among members described above. A housing 14 is disposed outside those members to maintain the relationship among those members, whereupon the stator is made up.

As shown in FIG. 4B, a rotor includes the six pieces of magnets 17 disposed at equal intervals on one surface of a rotary magnetic disc 18 so that an S-pole and an N-pole are alternately arranged, and fixed by a method of adhesion, and so forth. Two pieces of the rotors are manufactured, each of the rotors being disposed above and below the stator, respectively. A shaft 15 is securely attached to the central part of the disc 18 of one of the rotors by a method for press fitting, shrink fitting, adhesion, and so forth. A bearing 16 is disposed at an inner-side part (in the vicinity of the center) on one side of the disc 18.

In FIGS. 4A and 4B, the bearing holder 12 has a structure to be integrated with the stator iron-core holder. In other words, the bearing holder 12 serves also as the stator iron-core holder. The bearing 16 of the axial gap motor can be disposed inside the bearing holder 12. A holding member is disposed at the central part of the bearing holder 12 in the axial direction, and the bearing 16 is disposed on both sides of the holding member in the axial direction.

Although the bearing holder 12 and the stator iron-core holder are integrally formed in the present embodiment, the bearing holder 12 and the stator iron-core holder can be separately manufactured and combined with each other to form such a configuration as described above. For example, a bearing holder in a cylindrical shape can be combined with a stator iron-core holder in the shape of a hollow disc with the inner periphery circular in shape, by use of various means such as press fitting, shrink fitting, clearance fitting, and so forth, thereby forming the configuration described above.

In the final step, two pieces of the rotors are assembled with the stator. First, the bearing 16 disposed on the disc 18 of the rotor, to which the shaft 15 is fixed, is assembled with the bearing holder 12 of the stator. Next, the other of the bearing 16 is assembled with an opposed side of the bearing holder 12 to the side where the rotor is assembled. Finally, another piece of the rotor is assembled with the shaft 15, with which the rotor has been previously assembled, to be securely attached by the method for press fitting, shrink fitting, adhesion, and so forth. As a result of assembling by using such a method as described above, a motor of an axial gap structure is obtained. Since the iron core 102 made up of the amorphous foil strip has a high magnetic permeability and a low iron-loss, a very efficient motor can be obtained.

Second Embodiment

A second embodiment of a magnetic iron core according to the invention is described with reference to FIGS. 5A to 6C.

In the first embodiment, the iron core has the structure that, at the time when the amorphous foil strip is wound, the spacer, including an insulating material, that is continuously extended in the winding axial direction are interposed at a plurality of locations in the direction of winding (the circumferential direction of the iron core) to form the gaps between the windings of the amorphous foil strips. The second embodiment represents an example in which a spacer, including an insulating material, that is continuously extended in the circumferential direction is inserted between the windings of the amorphous foil strip.

Figure 5A:
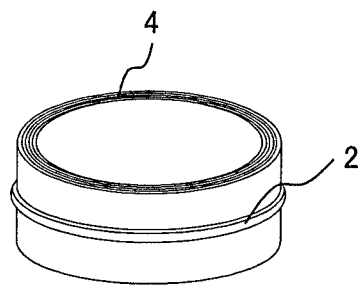
FIG. 5A is a view showing a spacer, including an insulating material, used in manufacture of an iron core according to a second embodiment of the invention, made by layering the amorphous foil strip, the spacer including an insulating material and continuing across the whole circumference of the iron core.

FIG. 5A is a view showing the windings of the amorphous foil strip 4 and a spacer 2, according to the present embodiment. As shown in FIG. 5A, after the amorphous foil strip 4 is wound a plurality of turns (for example, 40 turns as is the case with the first embodiment), the spacer 2 continuing across the whole circumference of a wound iron core, in a ring-like shape, is disposed at least one portion of the wound iron core in the axial direction of a laminate of the amorphous foil strip 4 (the vertical direction in FIG. 5A). In FIG. 5A, one piece of the spacer 2 is disposed at the central part of the wound iron core in the axial direction of the laminate of the amorphous foil strip 4. In this method, a gap can be secured evenly in the circumferential direction of the wound iron core.

Figure 5B:
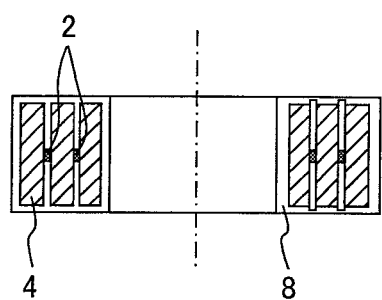
FIG. 5B is a view showing a cross section of the iron core according to the second embodiment of the invention in a plane parallel to the axial direction thereof.

FIG. 5B is a cross-sectional view of the wound iron core formed by molding with resin after the amorphous foil strip 4 has been wound in such a state as described above, showing a cross section of the same spot as shown in FIG. 2B in the first embodiment. As is evident from the cross-sectional view in FIG. 5B, the spacer 2 remains at the central part in the axial direction of the laminate, where the spacer 2 is disposed, and the whole wound iron core, including the periphery of the remaining portion of the spacer 2, is covered with a resin part 8. Accordingly, with the present embodiment as well, the strength of the wound iron core can be enhanced, and the same effect as in the case of the first embodiment can be achieved.

Third Embodiment

A third embodiment of a magnetic iron core according to the invention is described with reference to FIGS. 6A to 6C.

Figure 6A:
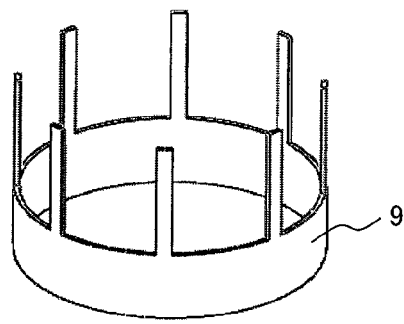
FIG. 6A is a view showing a mold used in manufacture of an iron core according to a third embodiment of the invention, made by layering the amorphous foil strip.
Figure 6B:
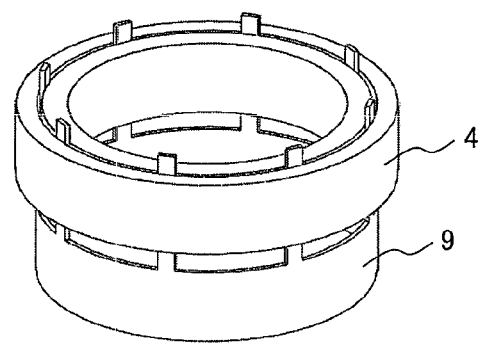
FIG. 6B is a view showing the mold according to the third embodiment of the invention and the windings of the amorphous foil strip.
Figure 6C:
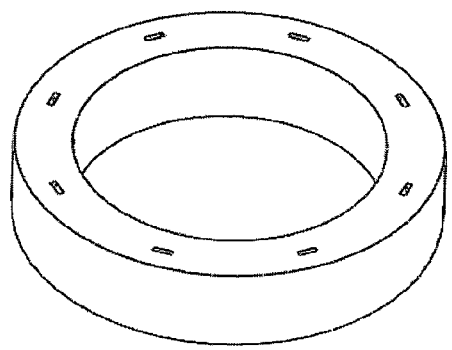
FIG. 6C is a view showing a layered iron core with the windings of the amorphous foil strip, manufactured with the use of the mold according to the third embodiment of the invention.

FIGS. 6A to 6C show a method for forming gaps of the magnetic iron core according to the invention by using a mold, the gap being provided to be filled up with resin.

First, a mold 9 in a ring-like shape is prepared which has thin protrusions disposed in the circumferential direction as shown in FIG. 6A. In the example shown in FIG. 6A, the eight protrusions are provided in the circumferential direction, and the gaps into which the resin is injected are formed by the protrusions. Although only one gap can be formed with the use of the mold 9 shown in FIG. 6A, molds different in diameter may be combined with each other so that plural gaps are formed.

Next, as shown in FIG. 6B, the protrusions of the mold 9 are inserted in an intermediate region in the radial direction of the windings of the amorphous foil strip 4, and the amorphous foil strip 4 are further wound. After the amorphous foil strip 4 has been wound a predetermined number of turns, the amorphous foil strip 4 and the mold 9 are disposed in a mold for injection molding, carrying out injection molding.

After completion of molding with resin, the mold 9 is removed, whereupon a wound iron core in a shape shown in FIG. 6C is formed. With the use of this method as well, the strength of the wound iron core can be enhanced, and the same effect as in the case of the first embodiment can be achieved.

Fourth Embodiment

A fourth embodiment of a magnetic iron core according to the invention is described with reference to FIGS. 7A to 7D.

With each of the first to third embodiments, method has been described where the magnetic iron core according to the invention is applied to a stator. The magnetic iron core according to the invention has a high strength and, therefore, can be utilized as a rotor as well.

Figure 7A:
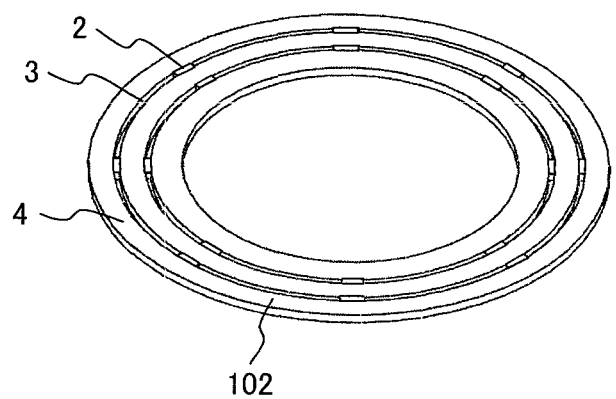
FIG. 7A is a view showing a wound iron core made of amorphous foil strips, according to a fourth embodiment of the invention.

FIG. 7A shows a wound iron core including amorphous foil strips, formed as thin as possible (that is, as short as possible in the axial direction). Since a thin iron core (the wound iron core) 102 according to the present embodiment is manufactured by winding a finely slit amorphous foil strip, the wound iron core 102 can be formed with relative ease. Further, as shown in FIG. 7A, the amorphous foil strip 4 is wound so that gaps are provided between spacers 2 for every plural numbers of windings thereof.

Figure 7B:
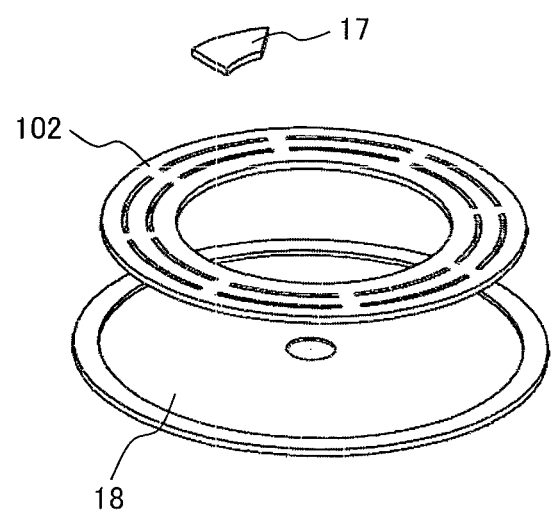
FIG. 7B is a view showing a built-up structure according to the fourth embodiment of the invention, combining a wound iron core with a disc and magnets.

FIG. 7B shows a built-up structure for combining the wound iron core 102 with a disc 18 that is a holding part for holding the outer side and the underside of the wound iron core 102. After the wound iron core 102 is assembled with the disc 18, magnets 17 are temporary fixed to the upper surface of the wound iron core 102 by adhesion, and so forth.

Figure 7C:
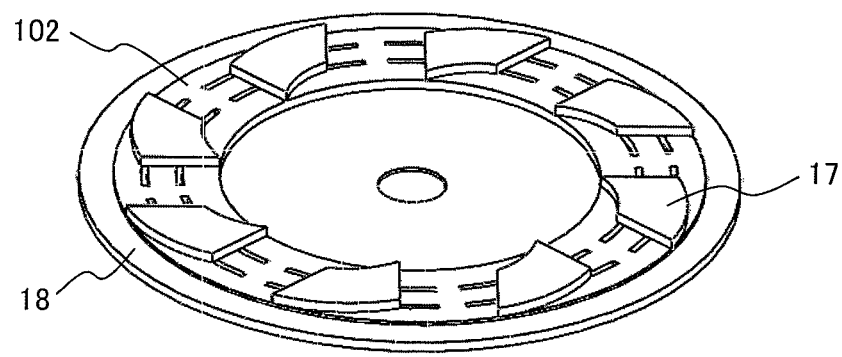
FIG. 7C is a view showing a configuration of a rotor of an axial gap motor, making use of the wound iron core according to the fourth embodiment of the invention.

FIG. 7C is a view showing a rotor of an axial gap motor, made by disposing eight sheets of the magnets 17 on the wound iron core 102. With adoption of such a structure above, it is possible to reduce eddy-current loss occurring due to a change in magnetic fluxes passing through the rear side (the underside) of the magnet 17.

Figure 7D:
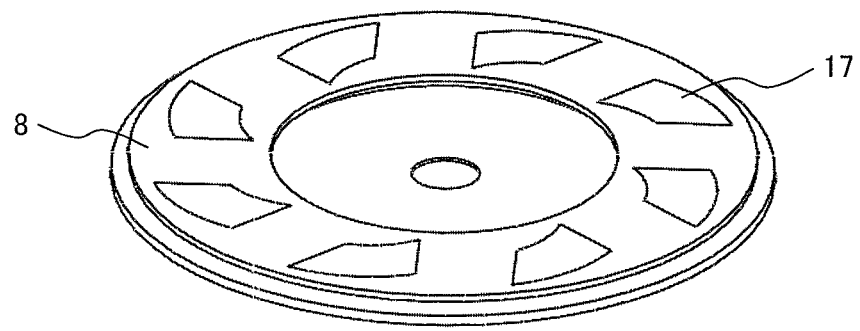
FIG. 7D is a view showing the rotor of the axial gap motor, making use of the wound iron core according to the fourth embodiment of the invention.

In the last step, as a method for permanently fixing the magnets 17, the whole of the wound iron core, the magnets 17, and the disc 18 are securely held together by molding with resin. FIG. 7D shows a structure in which the whole rotor, including the magnets 17 and the wound iron core, is molded with a resin part 8. By this method, the resin fills the gaps of the wound iron core to keep the strength high, and the surface of the magnet 17 is covered with the resin to reduce windage loss (mechanical loss).

Fifth Embodiment

A fifth embodiment of a magnetic iron core according to the invention is described with reference to FIGS. 8A to 8C.

Figure 8A:
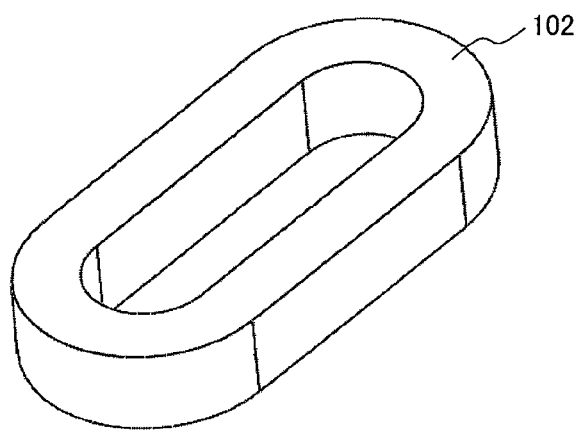
FIG. 8A is a view showing an iron core according to a fifth embodiment of the invention, made by layering the amorphous foil strip.

FIG. 8A shows an iron core according to the present embodiment. An iron core 102 according to the present embodiment has a cross-section perpendicular to the axial direction, the shape of the cross-section being an oval-like form made up by two straight lines opposed to each other and two arcs, each of the arcs connecting the two straight lines. If an amorphous foil strip is wound in the oval-like form instead of in a circle form, an iron core in the oval-like shape can be manufactured. Normally, the iron core of a static electrical machine, such as a reactor or a transformer, often takes the shape like the oval-like form.

Even in the case where the amorphous foil strip is wound in such a form as described above, a winding method described with reference to the first embodiment is adopted, and winding is executed while securing gaps with the aid of spacers every time that the amorphous foil strip is wound by a plurality of turns. Finally, the whole of the magnetic iron core is molded with resin (by the injection molding or the transfer molding) to establish a shape in which the gaps are filled up with the resin. By this method, the amorphous foil strip is electrically insulated for every plural windings, and an iron core high in fixation strength can be obtained.

Figure 8B:
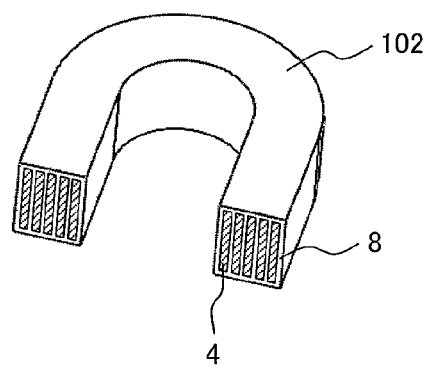
FIG. 8B is a perspective cross-sectional view of the iron core according to the fifth embodiment of the invention.

FIG. 8B is a perspective cross-sectional view showing the iron core 102 after molded in an oval-like cross-sectional shape, cut in half at the center in the longitudinal direction. Since the iron core 102 is made up so that the laminate of the amorphous foil strip 4 and resin part 8 are alternately disposed, a problem such as exfoliation of the amorphous foil strip does not arise at the time of cutting the iron core.

Figure 8C:
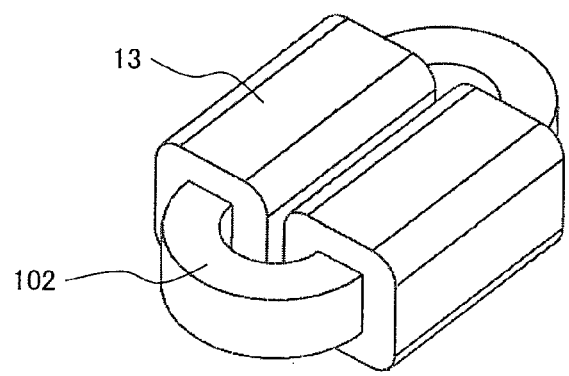
FIG. 8C is a view showing a reactor in which the magnetic iron core according to the fifth embodiment of the invention is used.

FIG. 8C is a view showing a reactor in which the magnetic iron core according to the present embodiment is utilized. The reactor is made up by disposing two pieces of coils 13 on the iron core 102 according to the present embodiment.

Although the iron core 102 in the present embodiment has an oval-like cross-section perpendicular to the axial direction, the cross-section of the iron core 102 can be a quasi-polygon shape and is indifferent to the shape.

The wound iron core according to any of those embodiments described in the foregoing has a wide range of application and is applicable to a reactor, a transformer, a choke-coil iron core, a noise-filter iron core, an electrical machine having toroidal windings, and so forth. For example, the magnetic iron core according to the invention can be used for the iron core of a stator and the yoke of a rotor in the axial-gap rotating electrical machine. It is also possible to adopt a configuration in which the magnetic iron core and the magnets making up the rotor are embedded in resin to be integrated with each other.

With the magnetic iron core according to the invention, higher efficiency can be attained due to reduction in losses occurring to the iron cores, and higher strength can be implemented because resin is disposed between the laminates of the amorphous foil strip. Further, since the magnetic iron core can be manufactured with ease, it is possible to reduce the time and cost in manufacturing.

With the present invention, since high magnetic permeability characteristics of an amorphous metal can be effectively utilized, not only enhancement can be expected in performance of an electromagnetic application product due to improved efficiency and miniaturization, but also reduction can be achieved in cost due to simplification of a manufacturing process and use of a lower grade magnetic material, providing a high-performance and cost-effective product. Since the magnetic iron core according to the invention is used for electromagnetic application products that generate and consume most of electricity, the magnetic iron core has an advantageous effect, such as significant reduction in $CO_2$ emission, and can be part of countermeasures against a global environmental problem.

With those embodiments described in the foregoing, the wound iron core has been described including the windings of the amorphous foil strip. However, the magnetic iron core including the thin steel sheets (cold-rolled steel sheets or thin electromagnetic steel sheets) also has the same effect as described above. In the case where the magnetic iron core is made up by winding the cold-rolled steel sheet or the electromagnetic steel sheet, the iron-core packing factor needs to be 80% or more in order to obtain magnetizing properties required for a motor (a rotating electrical machine). Accordingly, every time that the cold-rolled steel sheet or the electromagnetic steel sheet is wound by a predetermined number of turns so that the iron-core packing factor is 80% or more, a spacer is disposed to provide a gap to be filled up with resin. Thereafter, in the same way as in the case of using the amorphous foil strip, a wound iron core is manufactured. The magnetic iron core including the steel sheets also can be used as the iron core of a stator and the yoke of a rotor in the rotating electrical machine, and the iron core of the static electrical machine, for example, as is the case with the wound iron core including the amorphous foil strips.

The magnetic iron core according to an embodiment of the present invention can be applied to an axial-gap type brushless motor intended to be small in size, high in efficiency, and low in noise level. A motor of an axial gap structure, making use of the magnetic iron core according to an embodiment of the present invention, can be applied to a general motor system, such as a thin and high-efficient fan system. In addition, the magnetic iron core according to an embodiment of the present invention can be applied to a wide range of products including a reactor, a transformer, a choke-coil iron core, a noise-filter iron core, an electrical machine with a toroidal winding.

What is claimed is:

1. A magnetic iron core comprising:
   a foil strip wound to form a plurality of core sections, each core section having a plurality of windings of the foil strip, the plurality of core sections forming the magnetic iron core; and
   a plurality of spacers disposed between windings, each spacer having a height configured to extend linearly in a direction parallel to an axis direction around which the foil strip is wound, a length configured to generate a gap between windings touching the spacer, and a width configured to fill a portion of the gap;
   wherein the magnetic iron core is filled with resin, the resin being disposed in the gap between windings touching the spacer;
   wherein the magnetic iron core is covered with resin integrated with and continuous to the resin disposed between windings.

2. The magnetic iron core according to claim 1, wherein the spacer is disposed between windings prior to the insertion of the resin in the gap between the windings touching the spacer, in order to enable the resin to be disposed between windings.

3. The magnetic iron core according to claim 1, wherein the magnetic iron core has a cross-section perpendicular to a winding axis of the foil strip; and wherein the cross-section of the magnetic iron core being in the shape of a circle, an oval, an ellipse, or a quasi-polygon.

4. The magnetic iron core according to claim 1, wherein the magnetic iron core is filled with the resin such that an iron-core packing factor is 80% or more.

5. An axial-gap rotating electrical machine comprising:
a stator including an iron core;
wherein the iron core includes the magnetic iron core according to claim 1.

6. An axial-gap rotating electrical machine comprising:
a rotor including a yoke;
wherein the yoke includes the magnetic iron core according to claim 1.

7. The axial-gap rotating electrical machine according to claim 6, further comprising:
a magnet included in the rotor;
wherein the magnetic iron core and the magnet are embedded in the resin, and integrated with each other.

8. An axial-gap rotating electrical machine comprising:
a stator including an iron core; and
a rotor including a yoke;
wherein the iron core and the yoke include the magnetic iron core according to claim 1.

9. A static electrical machine comprising the magnetic iron core according to claim 1, and a coil.

10. A magnetic iron core comprising:
an foil strip wound to form the magnetic iron core and cut into a plurality of core segments, along outlines extending from the central axis toward the radial direction, or at an angle to the radial direction, wherein each core segment is separated from another core segment by a cutting surface along a cutline, and wherein each core segment has a shape of a quasi-hexahedron;
wherein each of the cutting surfaces exposes a multi-winding of the foil strip, and a layer of resin formed prior to the creation of the cutting surface, the layer of resin being formed in a gap generated by use of a plurality of spacers disposed between windings of the foil strip.

11. The magnetic iron core according to claim 10, wherein each layer of resin exposed by the cutting surfaces of the magnetic iron core is integrated with, and continuous to, resin covering the other surfaces of the magnetic iron core.

12. A magnetic iron core comprising:
an electromagnetic steel sheet or a cold-rolled steel sheet, wound into windings to form a magnetic iron core, and cut into core sections, each core section having a plurality of windings of the electromagnetic steel sheet or cold-rolled steel sheet; and
a plurality of spacers disposed between windings, each spacer having a length extending linearly in a direction parallel to an axis direction around which the foil strip is wound, a height configured to generate a gap between windings touching the spacer, and a width configured to fill a portion of the gap;
wherein the gaps in the magnetic iron core are filled with resin such that an iron-core packing factor is 80% or more, the resin being disposed between windings of the electromagnetic steel sheet or the cold-rolled steel sheet;
wherein the magnetic iron core is covered with resin integrated with and continuous to the resin disposed between windings.

* * * * *